(12) United States Patent
Pettersson et al.

(10) Patent No.: US 9,977,642 B2
(45) Date of Patent: May 22, 2018

(54) METHODS AND APPARATUSES FOR SUPPORTING SCREEN SHARING

(71) Applicant: Telefonaktiebolaget L M Ericsson (publ), Stockholm (SE)

(72) Inventors: Martin Pettersson, Vallentuna (SE); Jonatan Samuelsson, Stockholm (SE); Ying Wang, Stockholm (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 318 days.

(21) Appl. No.: 14/441,886

(22) PCT Filed: Jan. 27, 2015

(86) PCT No.: PCT/SE2015/050078
§ 371 (c)(1),
(2) Date: May 11, 2015

(87) PCT Pub. No.: WO2016/122358
PCT Pub. Date: Aug. 4, 2016

(65) Prior Publication Data
US 2016/0216932 A1    Jul. 28, 2016

(51) Int. Cl.
*G06F 3/0338* (2013.01)
*G06F 3/14* (2006.01)
(Continued)

(52) U.S. Cl.
CPC .......... *G06F 3/1454* (2013.01); *G06F 3/0338* (2013.01); *G06T 7/20* (2013.01);
(Continued)

(58) Field of Classification Search
None
See application file for complete search history.

(56) References Cited

U.S. PATENT DOCUMENTS

2006/0017843 A1   1/2006   Shi et al.
2010/0149422 A1*  6/2010   Samuelsson ......... H04N 19/139
                                                   348/699
(Continued)

FOREIGN PATENT DOCUMENTS

EP    2237559 A1    10/2010

OTHER PUBLICATIONS

Unknown, Author, "H.265 High efficiency video coding", International Telecommunication Union, ITU-T, Series H: Audiovisual and Multimedia Systems, Infrastructure of audiovisual services—Coding of moving video, Apr. 2013, 1-317.

*Primary Examiner* — Kent Chang
*Assistant Examiner* — Benjamin Morales Fernande
(74) *Attorney, Agent, or Firm* — Murphy, Bilak & Homiller, PLLC (57) ABSTRACT

The invention relates to an encoder and a decoder and methods therein for supporting screen sharing, where the screen sharing comprises encoding pictures F representing pixels of a shared screen, providing said pictures to a decoder where they are decoded. The method performed by the encoder comprises deriving information related to an object which is moved on the shared screen between two pictures $F_n$ and $F_{n+1}$. At least part of the derived information is related to an intermediate position of the object, on the shared screen, between the two pictures $F_n$ and $F_{n+1}$. The method further comprises providing said information to the decoder, thereby enabling the decoder to generate intermediate pictures, $F_{IMD}$, in addition to the pictures, F, based on the provided information, wherein the object is generated in different positions in said intermediate pictures, $F_{IMD}$, thus reconstructing the movement of the object between two provided pictures $F_n$ and $F_{n+1}$.

32 Claims, 5 Drawing Sheets

(51) Int. Cl.
*G06T 7/00* (2017.01)
*G06T 7/20* (2017.01)
*H04N 19/70* (2014.01)
*G06T 7/70* (2017.01)
*H04N 19/46* (2014.01)
*H04N 19/587* (2014.01)

(52) U.S. Cl.
CPC ............... *G06T 7/70* (2017.01); *G06T 7/97* (2017.01); *H04N 19/70* (2014.11); *G06T 2207/10016* (2013.01); *H04N 19/46* (2014.11); *H04N 19/587* (2014.11)

(56) References Cited

U.S. PATENT DOCUMENTS

| | | | |
|---|---|---|---|
| 2010/0201870 A1 | 8/2010 | Luessi et al. | |
| 2012/0213449 A1* | 8/2012 | Samuelsson | H04N 19/182 382/238 |
| 2013/0170551 A1* | 7/2013 | Liu | H04N 7/014 375/240.16 |
| 2015/0373374 A1* | 12/2015 | Ramasubramonian | H04N 19/70 375/240.27 |

* cited by examiner

METHODS AND APPARATUSES FOR SUPPORTING SCREEN SHARING

TECHNICAL FIELD

The embodiments of the present invention relates to video coding, and in particular to supporting screen sharing.

BACKGROUND

Specific screen content services, such as screen sharing and screen monitoring are becoming increasingly popular. Screen content puts different demands on video coding than, for example, encoding of camera captured content. Typical screen content includes windows with sharp edges, graphics and text, distinct colors and tends to have areas of the video picture that are not updated for long periods of time.

Screen sharing, which may also be referred to e.g. as desktop sharing, may be used in many different scenarios where it is desired to keep the bandwidth for screen sharing at a limited level. One common way of decreasing the bitrate for the screen sharing video without decreasing the overall static quality is to lower the picture rate. Static screen video, such as desktops and presentations, still tend to look reasonably good at a lower picture rate, while, at the same time, the complexity of the encoder and decoder may be reduced. The picture resolution in a screen sharing scenario is often 1080p or higher, which can be very resource consuming. Typically, the receiving device is also, simultaneously, performing other tasks, such as decoding a high quality video in a video conference scenario. By reducing the picture rate, the complexity of the coder and decoder can be significantly reduced.

However, when coding at a low picture rate in a scenario where a mouse pointer is used on the shared screen, the mouse pointer path may appear quite jerky and difficult to follow, which significantly lowers the screen sharing experience. Moreover, in a scenario where the mouse pointer is remotely controlled, such jerky movements become problematic, as it then becomes more difficult to control the mouse pointer. In addition, other 2D screen objects such as moving windows and scrolling text may be difficult for an observer to properly follow at a low picture rate.

SUMMARY

It is desired to achieve a smooth movement of objects during screen sharing at a relatively low picture rate. This is achieved by signaling, from an encoder side to a decoder side, parameters for the object and its motion path, such as a motion trajectory and a pixel mask for the object with starting coordinates, width and height. The decoder may then use this information to reconstruct the motion path for the object at a desired output picture rate by constructing intermediate pictures.

Thereby, a perceived smooth object motion can be achieved without having to encode the video at a high bitrate. Thus bitrate can be saved. Another advantage is that the decoder may reconstruct the motion path for the object at a picture rate decided at the decoder side.

According to a first aspect, a method is provided for supporting screen sharing. The method is to be performed by a decoder, and the screen sharing comprises receiving, with a picture rate R, from an encoder, encoded pictures F representing pixels of a shared screen, and decoding said received pictures. The method comprises obtaining information related to an object which is moved on the shared screen between two received pictures $F_n$ and $F_{n+1}$. At least part of the information is related to an intermediate position of the object between the two pictures $F_n$ and $F_{n+1}$. The method further comprises generating intermediate pictures, $F_{IMD}$, in addition to the pictures, F, based on the obtained information. The object is generated in different positions in said intermediate pictures, $F_{IMD}$, based on the obtained information, thus reconstructing the movement of the object between the two pictures $F_n$ and $F_{n+1}$.

According to a second aspect, a method is provided for supporting screen sharing. The method is to be performed by an encoder, and the screen sharing comprises encoding pixels of a shared screen, and providing encoded pictures F to a decoder with a picture rate R. The method comprises deriving information related to an object which is moved on the shared screen between two pictures $F_n$ and $F_{n+1}$. At least part of the derived information is related to an intermediate position of the object, on the shared screen, between the two pictures $F_n$ and $F_{n+1}$. The method further comprises providing said information to the decoder.

According to a third aspect, a decoder is provided for supporting screen sharing. The decoder is configured for receiving, with a picture rate R, from an encoder, encoded pictures F representing pixels of a shared screen, and decoding said received pictures. The decoder being further configured to obtain information related to an object which is moved on the shared screen between two received pictures $F_n$ and $F_{n+1}$, at least part of the information being related to an intermediate position of the object between the two pictures $F_n$ and $F_{n+1}$; and further to generate intermediate pictures, $F_{IMD}$, in addition to the pictures, F, based on the obtained information, such that the object is generated in different positions in said intermediate pictures, thus reconstructing the movement of the object between the two pictures $F_n$ and $F_{n+1}$.

According to a fourth aspect, an encoder is provided for supporting screen sharing, the encoder being configured to encode the content on a screen, and provide encoded pictures F to a decoder with a certain picture rate R. The encoder is further configured to derive information related to an object which is moved on the shared screen between two pictures $F_n$ and $F_{n+1}$, at least part of the information being related to an intermediate position of the object between the two pictures $F_n$ and $F_{n+1}$. The encoder is further configured to provide said information to the decoder.

According to a fifth aspect a device is provided, which comprises a decoder according to the third aspect.

According to a sixth aspect a device is provided, which comprises an encoder according to the fourth aspect.

According to a seventh aspect, a computer program is provided, which comprises instructions which, when executed on at least one processor, cause the at least one processor to carry out the method according to the first and/or second aspect.

According to an eighth aspect, a carrier is provided, which contains the computer program of the seventh aspect.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

The solution which will be described below relates to methods and devices for supporting screen sharing. A typical example of screen sharing is e.g. when participants in a video conference, in addition to the actual video conference, share a view of a desktop, where e.g. slides may be presented and thus viewed by the participants irrespective of location. That is, the content of a computer screen or display is shared, such that it may be viewed, and possibly controlled, by participants at different locations. The encoding and decoding described herein could be used as a complement to an existing procedure for screen sharing, or be part of a new screen sharing solution. For example, embodiments described herein could be implemented in an extended version of a HEVC (High Efficiency Video Coding) codec.

The solution disclosed herein describes a way to increase the output picture rate, at a decoder, for a mouse pointer or some other object, without increasing the input picture rate of the coded screen sharing video. This is done by constructing one or more intermediate pictures, e.g. by overlaying the mouse pointer from a reference picture on top of a decoded picture $F_n$ preceding the intermediate picture(s) at a position associated with the presentation time of the intermediate picture. The decoder may further conceal the object in a previous position in the best possible way, e.g. by copying the background from an earlier decoded picture.

Herein, it is referred to pictures that are encoded and conveyed at a certain picture rate; intermediate pictures, etc. Even though, in video coding, the definition of the terms "picture" and "frame" may be slightly different, the term "picture" herein could be exchanged for "frame", if preferred, without changing the inventive concept.

Exemplifying Embodiments

Below, exemplifying embodiments will be described.

First, exemplifying embodiments performed by an encoder will be described with reference to FIG. 1. Then, further below, exemplifying embodiments performed by a decoder will be described with reference to FIG. 2. Embodiments described herein enable improvement of user experience of screen sharing while using a low picture rate. Further below, embodiments of an encoder, a decoder and other devices will be described.

Method Embodiments Performed by Encoder

Figure 1:
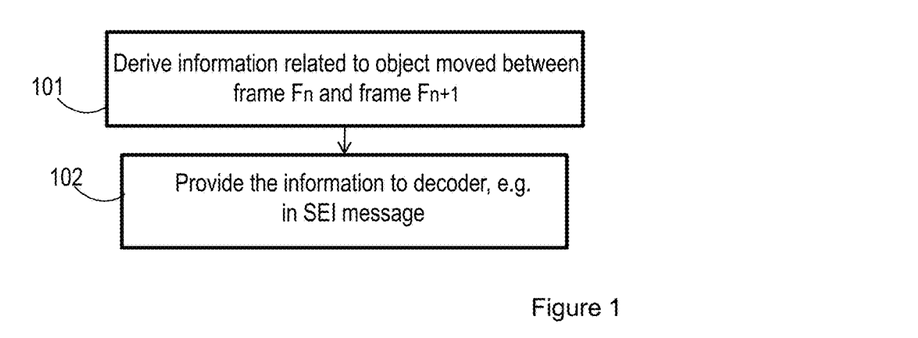
FIG. 1 is a flow chart showing a method performed by an encoder according to an exemplifying embodiment.

FIG. 1 illustrates a method performed by an encoder operable in a device in a communication network. The method is suitable for supporting screen sharing, where pixels of a shared screen are encoded and provided as encoded pictures, F, to a decoder. $F=\{F_0 \ldots F_{N-1}\}$ where N is the number of pictures. The pictures F are provided to the decoder with a picture rate R, which it is desired to keep low, in order to save bandwidth. The method comprises deriving 101 information related to an object, such as a mouse pointer/cursor or a window, which is moved on the shared screen between two pictures $F_n$ and $F_{n+1}$. At least part of the derived information is related to an intermediate position of the object, on the shared screen, between the two pictures $F_n$ and $F_{n+1}$. The method further comprises providing 102 said information to the decoder.

By performing the method in the encoder, the decoder is enabled to generate intermediate pictures, $F_{IMD}$, in addition to the pictures, F, provided with picture rate R, based on the provided information, wherein the object is generated in different positions in said intermediate pictures, $F_{IMD}$, thus reconstructing the movement of the object between two provided pictures $F_n$ and $F_{n+1}$. $F_{IMD}$ may be one or more intermediate pictures, where the number of intermediate pictures may depend e.g. on a configuration of the decoder.

Below, the object will sometimes be exemplified by a mouse pointer, an object which intuitively facilitates the understanding of the benefits of the solution described herein. The object could, however, alternatively be e.g. a cursor, an application window, 2D graphics, scrolling text or an image. An example of when the object is an image may be e.g. a moving image in an image slide show where the movement is during the change of the pictures or to get a harmonic floating appearance while showing a picture. Similarly, the object could be a slide during a slide change in a slide show presentation, such as PowerPoint.

That the object is moved between two pictures $F_n$ and $F_{n+1}$ means that the object is located in a first position, also denoted original position, in picture $F_n$, and in another, second position in picture $F_{n+1}$, where the notation $F_n$ and $F_{n+1}$ is intended to refer to two consecutive pictures provided to the decoder with picture rate R. That is, the pictures $F_n$ and $F_{n+1}$, which may also be referred to as regular pictures, are part of the regular screen sharing, i.e. $F_n$ and $F_{n+1} \in F$. The intermediate pictures, here denoted $F_{IMD}$, are not, on the other hand, part of the regular screen sharing, but a part of the herein suggested solution. The intermediate pictures are generated at the decoder side, which will be described in more detail further below.

The information derived in action 101 may comprise a number of different components, of which at least one is related to an intermediate position of an object between two consecutive pictures, as described above. The information may comprise parameters, such as coordinates, representing an intermediate position of the object. Alternatively or in addition the information may comprise parameters representing a trajectory, e.g. in form of a polynomial function, of the object between two pictures. The intermediate position or positions may be described both spatially and temporally, where the temporal description would refer to the object's acceleration and/or deceleration. The information may be derived in a number of ways, e.g. by obtaining the mouse pointer positions from an application or system API, or through object detection in intermediate pictures that are not encoded and transmitted.

Figure 3:
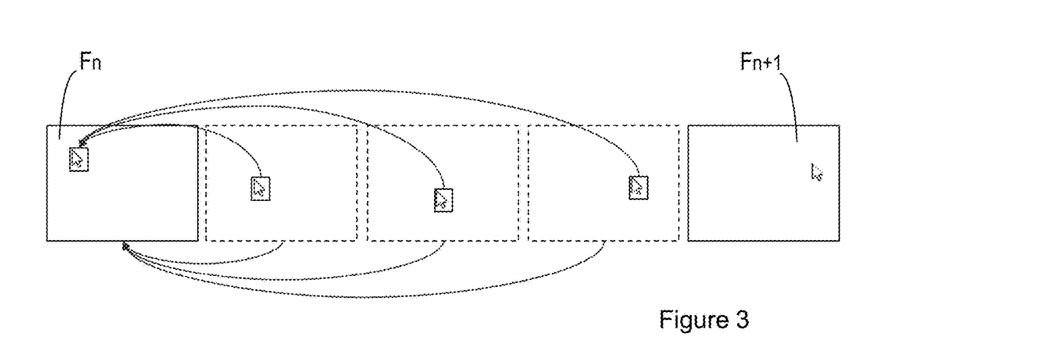
FIG. 3 illustrates intermediate pictures constructed between two regular pictures according to an exemplifying embodiment.

That is, the information related to a position of the object may describe a motion trajectory of the object between "known" positions of the objects, e.g. the position in picture $F_n$ and the position in $F_{n+1}$. In one embodiment the motion trajectory is described using intermediate coordinates, evenly or variably spaced in time between the starting position and end position of a motion path, e.g. between two decoded pictures, which may be consecutive, but not necessarily so. For example, FIG. 3 shows five pictures, of which the three in the middle should illustrate intermediate pictures, which are not encoded or provided by the encoder, but generated by the decoder. The mouse pointer coordinates for the five pictures in FIG. 3 may be e.g. (2,2), (3,4), (5,5), (8,4) and (10,3). The intermediate coordinates, i.e. (3,4), (5,5), (8,4) in this example, may be differentially encoded from the previous coordinate, giving the differential coordinates (1,2), (2,1), (3,−1) for the intermediate pictures. These differential coordinates could be coded more efficiently than the absolute coordinates. In case the intermediate coordinates are variably spaced in time, a time instance t could be signaled for each coordinate.

In another embodiment, where an even denser and more flexible occurrence of intermediate pictures is desired than for the version above, points in the motion trajectory could be derived by describing the motion trajectory as one or several connected Bezier curves or B-splines, or by using some other polynomial function. These curves may be used for describing the motion path for the mouse pointer both spatially and temporally, i.e. may also describe the acceleration and deceleration of the mouse pointer. For Bezier curves each intermediate point $P_i$ for each segment would need to be signaled and for B-spline curves, the knots, also denoted break-points, should be signaled for each segment. The intermediate points $P_i$ and the knots could be signaled in a similar way as the coordinates in the version of the embodiment described above. The coefficients $\alpha_i$ and the degree k of B-spline function could be signaled or derived at the decoder side. Bezier curves and B-splines will be described in more detail further below.

Figure 4:
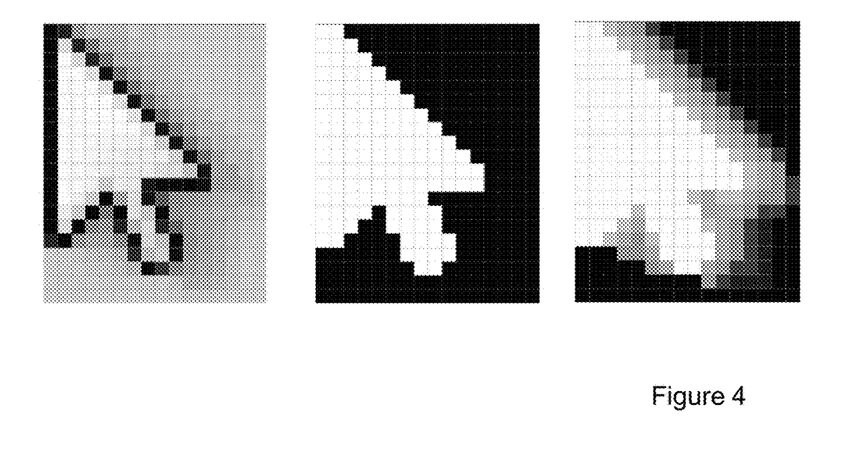
FIG. 4 shows examples of pixel masks related to a mouse pointer.

The information derived in action 101 may further comprise an indicator of a location of the object in a reference picture and/or an indicator of an outline of the object in a reference picture. The reference picture may be the picture $F_n$, or some previous picture, in decoding order, in which the object appears. The reference picture may also be indicated to the decoder, e.g. as part of the derived information provided to the decoder. Alternatively, the reference picture is implicitly indicated, e.g. as being the picture $F_n$, or some other certain preceding picture. An example of an indicator of an outline of the object may be a pixel mask, or bitmask, with a certain width and height. Examples of pixel masks are illustrated in FIG. 4, which will be described in more detail further below. An indicator of an outline may alternatively be an explicit or implicit reference to a previously transmitted bit mask. Further, as a location indicator, starting x- and y-coordinates for the pixel mask in the reference picture may be indicated. Together, the pixel mask and the location coordinates e.g. of a corner of the pixel mask in a reference picture enable a decoder to derive the object from the reference picture. The pixels of the pixel mask may take on e.g. two (in case of an opaque object) or three values (in case of semi-transparent parts of the object). The scanning order of the pixel mask may be e.g. horizontal or vertical raster scan or Z-scan. The pixel mask may be encoded using e.g. run length coding. For symmetric objects, such as a window, a geometric description could be indicated, e.g. a starting coordinate and the size of the window. As an alternative to a pixel mask, the pixels of the object itself may be signaled, e.g. using a separate RGB or RGBA picture buffer.

The derived information may further comprise a descriptor of pixels in a picture which are disoccluded by movement of the object. That is, when the object is moved, pixels which were hidden behind the object, i.e. occluded by the object, will be revealed, i.e. disoccluded. The encoder may derive information of pixels which are occluded by the object in a picture $F_n$, e.g. from a subsequent picture $F_{n+1}$, or from a preceding picture $F_{n-x}$, where $0 < x \le n$. The descriptor may be e.g. an indicator of a picture comprising the pixels which are occluded by the object in the picture $F_n$. Concealment of the object will be further described below.

The information related to a moved object derived by the encoder may be provided to the decoder in different ways. By providing is meant e.g. transmitting, signaling, sending or otherwise conveying the information. In a preferred embodiment, the information, e.g. the parameters described above, are signaled to the decoder in one or more so-called SEI messages, where SEI stands for Supplementary Enhancement Information. This embodiment will be used as an example below. However, the information could alternatively be signaled e.g. as part of a Picture Parameter Set, PPS, a Sequence Parameter Set, SPS, a Video Parameter Set, Video Usability Information, VUI, or in a slice header. The provided information may then, as previously described, be used by the decoder to construct additional intermediate pictures to allow for a smoother motion of the object, e.g. mouse pointer, without the need for increasing the transmitted picture rate. An advantage of using an SEI message for carrying the information is that it is optional for a decoder whether to decode an SEI message or not. This means that the decoder may be configured, e.g. based on capacity, need or preference, to use the solution described herein or not. This may e.g. be configured by a user during a screen sharing session.

When, as an example, signaling the information in an SEI message, the SEI message may be sent together with a picture preceding the object movement, or, together with a picture following the object movement. The object movement-related SEI message may be configured to be valid e.g. until the next picture, or for a longer duration. The SEI message only needs to be transmitted when the object is moved.

The information could be sent in one single SEI message, but could alternatively be sent in a plurality of SEI messages. For example, one SEI message could be sent for each intermediate position of the object, e.g. mouse pointer. This would reduce the delay until the mouse pointer can be rendered since neither the encoder nor the decoder needs to wait until the next picture. In such cases, each SEI message need not comprise all information such as e.g. a pixel mask, but an SEI message may reference a pixel mask or any of the other parameters from a previously signaled SEI message. The information in the SEI message may, for example, describe or indicate a reference picture, a pixel mask, starting coordinates, width and height for the pixel mask and a motion trajectory for the mouse pointer.

Below is an example of an SEI message for a mouse pointer object movement with a simple 1 bit-per-pixel sample mask and equally spaced mouse pointer positions. The "Descriptor" column describes how the parameters are encoded in the bitstream using the notations from the HEVC specification:

| mouse_pointer_info( payloadSize ) { | Descriptor |
|---|---|
| start_coordinate_x | ue(v) |
| start_coordinate_y | ue(v) |
| size_x | ue(v) |
| size_y | ue(v) |
| for( i = 0; i <= size_x * size_y; i++ ) | |
| sample_mask[ i ] | u(1) |

```
mouse_pointer_info( payloadSize ) {                        Descriptor
    number_of_positions                                    ue(v)
    for( i = 0; i <= number_of_positions; i++ ) {
        x_coord[ i ]                                       ue(v)
        y_coord[ i ]                                       ue(v)
    }
}
```

The sample_mask[ ] could alternatively be encoded using run-length coding to potentially decrease the number of bits that needs to be transmitted as in the example below which alternates the value for each run between 1 and 0:

```
mouse_pointer_info( payloadSize ) {                        Descriptor
    start_coordinate_x                                     ue(v)
    start_coordinate_y                                     ue(v)
    size_x                                                 ue(v)
    size_y                                                 ue(v)
    nbr_runs                                               ue(v)
    for( i = 0, pos = 0; i <= nbr_runs; i++ )
        run                                                ue(v)
        for (j = 0, j < run; j++)
            sample_mask[pos+j] = (i+1)%2
        pos += run
    }
    }
    number_of_positions                                    ue(v)
    for( i = 0; i <= number_of_positions; i++ ) {
        x_coord[ i ]                                       ue(v)
        y_coord[ i ]                                       ue(v)
    }
}
```

It may be indicated in the beginning of the bitstream, e.g. in an SEI message, that object movement related information according to the above, e.g. SEI messages, may be present in the bitstream. This will allow the decoder to prepare for constructing intermediate pictures. The decoder preparations may include allocating resources such as memory and processing power, storing parts of pictures for concealing the object in its initial positing in the intermediate pictures and beginning to calculate the motion trajectory of an object.

Method Embodiments Performed by Decoder

Figure 2:
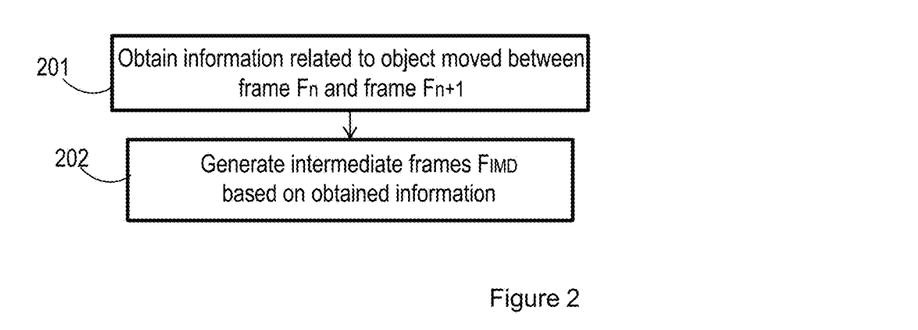
FIG. 2 is a flow chart flow chart showing a method performed by a decoder according to an exemplifying embodiment.

FIG. 2 illustrates a method performed by a decoder operable in a device in a communication network. The method is suitable for supporting screen sharing, where pixels of a shared screen are encoded by an encoder and provided as encoded pictures, F, to a decoder. The pictures F are provided to the decoder, and received by the decoder, with a picture rate R, which it is desired to keep low, in order to save bandwidth. The method comprises obtaining 201 information related to an object which is moved on the shared screen between two received pictures $F_n$ and $F_{n+1}$, at least part of the information being related to an intermediate position of the object, on the shared screen, between the two pictures $F_n$ and $F_{n+1}$. The method further comprises generating 202 intermediate pictures, $F_{IMD}$, in addition to the pictures, F, received with picture rate R, based on the obtained information. The object is generated in different positions in said intermediate pictures, $F_{IMD}$, based on the obtained information, thus reconstructing the movement of the object between the two pictures $F_n$ and $F_{n+1}$.

As before, the object could be e.g. a mouse pointer, a cursor, an application window, 2D graphics, scrolling text or an image.

The obtaining may comprise receiving the information, as provided by an encoder, as previously described. For example, the information may be received in one or more SEI messages. Alternatively or in addition, at least part of the information could be received as part of a Picture Parameter Set, PPS, a Sequence Parameter Set, SPS, a Video Parameter Set, a VUI, or in a slice header.

In one embodiment, which only relates to the decoder, the obtaining 201 comprises deriving the information related to the object which is moved on the shared screen based only on received encoded pictures F. However, this embodiment implies high requirements on the decoder. This decoder-only embodiment will be further described below.

In correspondence to what is described above in conjunction with the method performed by an encoder, the information obtained in action 201 may comprise a number of different components, of which at least one is related to an intermediate position of an object between two consecutive pictures. The information may comprise parameters, such as coordinates, representing an intermediate position of the object. Alternatively or in addition the information may comprise parameters representing a trajectory, e.g. in form of a polynomial function, of the object between two pictures. The intermediate position or positions may be described both spatially and temporally.

As previously described, the information obtained in action 201 may further comprise an indicator of a location of the object in a reference picture and/or an indicator of an outline of the object in a reference picture. The reference picture may be the picture $F_n$, or some previously received picture, in which the object appears. The reference picture may be received as part of the information provided by the encoder. Alternatively, the reference picture is implicitly indicated or preconfigured, e.g. as being the picture $F_n$, or some other certain preceding picture. An example of an indicator of an outline of the object may be a pixel mask, or bitmask, with a certain width and height. Examples of pixel masks are illustrated in FIG. 4. An indicator of an outline may alternatively be an explicit or implicit reference to a previously transmitted bit mask. Further, as a location indicator, starting x- and y-coordinates for the pixel mask in the reference picture may be obtained.

FIG. 4 shows examples of pixel masks related to mouse pointers. The pixel mask to the left shows a 16×20 pixels large area in a reference picture, from which the decoder may copy the mouse pointer. The middle pixel mask is a bitmask determining which pixels that belong to the mouse pointer. The pixel mask to the right in FIG. 4 shows a pixel mask describing the opacity in case of semi-transparent pixels. The bitmask, which only takes on two different values, may for instance be encoded using run length coding for easy parsing e.g. of the SEI message in which it is comprised. The scanning order may be e.g. horizontal or vertical raster scan or Z-scan.

In case the pixel mask includes semi-transparent pixels, as illustrated in the pixel mask to the right in FIG. 4, it is one alternative that the information related to the semi-transparent pixels, e.g. received in an SEI message, may indicate only that the object has semi-transparent pixels, but not the actual values of these pixels. It will then be up to the decoder to reconstruct the object for the intermediate pictures as truthfully as possible, i.e. to estimate the semi-transparent pixels as good as possible, based e.g. on information in a reference picture or the picture $F_{n+1}$.

In yet another embodiment, in case the pixel mask includes semi-transparent pixels, the pixels in the pixel mask may take on three different values representing opaque, semi-transparent or fully transparent pixels. Run length coding would also be suitable for this case. As above it would be up to the decoder to reconstruct the object for the intermediate pictures as truthfully as possible.

In case the pixel mask includes semi-transparent pixels, the pixel mask may be coded using auxiliary pictures.

FIG. 3 illustrates intermediate pictures, having a dashed outline, constructed by the decoder. The intermediate pictures are constructed by overlaying a mouse pointer from a reference picture, which is not necessarily the previous picture, on top of the previous picture. The reference picture and the motion trajectory for the mouse pointer are received as part of the bitstream or by other means. In this particular example, the mouse pointer is extracted from the reference picture using a pixel mask which is also signaled by the encoder and received by the decoder together with the starting coordinates, width and height of the pixel mask. Examples of when information is obtained outside the bitstream of encoded video may be when a reference picture is communicated before the start of the screen sharing, or, e.g. in dedicated screen sharing systems where the mouse pointer always look the same, the encoder may be configured with a reference picture and a pixel mask, or, a set of pixels describing the mouse pointer.

Obtaining Information from SEI Message

Figure 5:
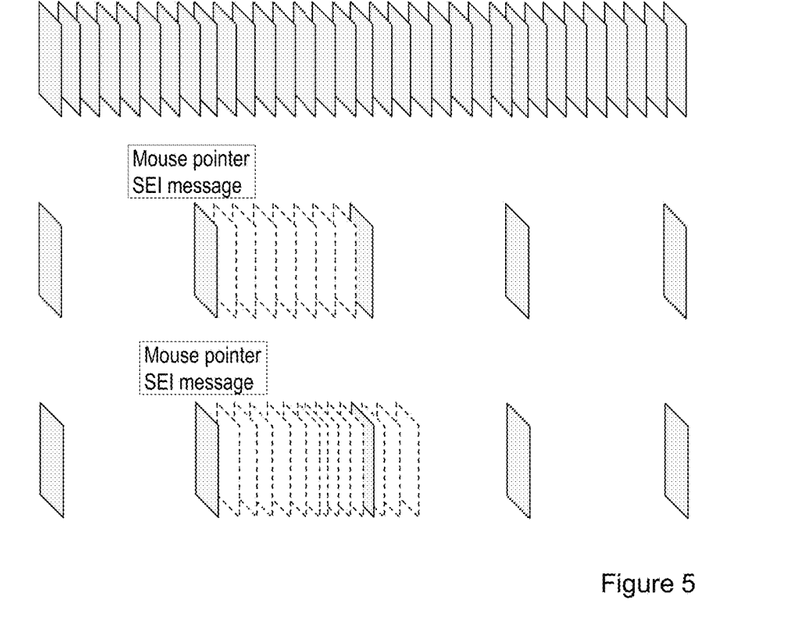
FIG. 5 illustrates two examples of intermediate pictures (dashed outline) constructed between regular pictures according to an exemplifying embodiment.

In an exemplifying embodiment, information related to a mouse pointer, which is moved on the shared screen, is received in one or more SEI messages from the encoder. FIG. 5 illustrates the generation of intermediated pictures or pictures based on a received SEI message. The upper picture of FIG. 5 shows video at a picture rate R of 60 pictures per second, as an example of a high picture rate solution. The middle and lower pictures show video at a reduced picture rate R of 7.5 fps. The middle picture illustrates the receiving of a mouse pointer SEI message comprising information describing how the mouse pointer path can be reconstructed in equally spaced intermediate pictures by the decoder. The constructed or generated intermediate pictures are illustrated with a dashed outline to separate them from the pictures F, received from the encoder. The lower picture in FIG. 5 illustrates the receiving of a mouse pointer SEI message comprising information describing how the mouse pointer path can be reconstructed in variable spaced intermediate pictures by the decoder.

The parameters signaled, e.g. in a mouse pointer SEI message, may describe a reference picture, a pixel mask, starting coordinates, width and height for the pixel mask and a motion trajectory for a mouse pointer or other object. Further, as previously described, instead of repeatedly signaling the pixel mask or any of the other parameters, a pixel mask or any of the other parameters from a previously signaled e.g. SEI message, may be referenced.

Disocclusion of Pixels Behind Object

When generating intermediate pictures based on a previously received picture $F_n$, constituting the background of the intermediate pictures, the object in its original position must be handled. When not concealing the object in its original position, it will remain in the intermediate pictures and may thus be perceived as a shadow by participants in the screen sharing event. The object may be concealed by copying pixels from a reference picture and introducing them in the generated intermediate pictures in the place of the pixels describing the object. In some embodiments the decoder is configured to conceal the "old mouse pointer" in the best possible way without any further knowledge of the occluded background. The decoder may derive such information of disoccluded pixels e.g. from a subsequent picture $F_{n+1}$, without having received any further information from the encoder. However, this requires some delay and may put higher demands on the decoder, and thus require higher complexity, and may therefore not be an as attractive solution as one where the information is received from the encoder.

In order to facilitate for the decoder to conceal the object in its original position, the obtained information, when received from an encoder, may further comprise a descriptor of pixels which are disoccluded by movement of the object. The descriptor may be e.g. an indicator of a picture comprising the pixels which are occluded by the object in the picture $F_n$. The pixels may be described with reference to a previously decoded picture or to a picture which will follow the intermediate pictures, e.g. $F_{n+1}$. When referring to a picture which follows the intermediate pictures, this picture will need to be received before the intermediate pictures may be generated. However, in many cases such a delay is acceptable. The position of the disoccluded pixels in the reference picture may be derived e.g. based on the mouse pointer position in the picture prior the intermediate picture to be constructed. Optionally, motion vectors are obtained in cases where the background pixels have moved between the reference picture and the picture prior to the intermediate picture to be constructed.

Alternatively, the descriptor may provide pixel values of the disoccluded pixels. That is, in some embodiments the disoccluded pixels are explicitly signaled in the bitstream. The disoccluded pixels could be signaled in an auxiliary picture, in an SEI message or in SPS/VPS. In some embodiments, the decoder estimates the pixel values of pixels occluded by the object in its original position in the picture $F_n$, preceding the intermediate pictures, and, then, when generating the intermediate pictures, the object may be concealed in its original position based on the estimated pixel values. The pixel values may be estimated based on a received picture such as Fn+1, or be estimated based on pixels surrounding the object in picture Fn.

In one embodiment an indication is received in the decoder, e.g. in an SEI message in the beginning of the bitstream, which indicates that information related to an object which is moved on the shared screen will be present in the bitstream. For example, the indication may be related to that mouse pointer SEI messages will be present in the bitstream. Such an indication enables the decoder to prepare for constructing intermediate pictures. The decoder preparations may include allocating resources such as memory and processing power, storing parts of pictures for concealing the mouse pointer of the background in the intermediate pictures and beginning calculating the motion trajectory of the mouse pointer.

Decoder Only

As mentioned above, a "decoder only" embodiment is possible, according to which the encoder need not be affected or adapted in any way. In the solution according to such an embodiment, the parameters described above, are not signaled in the bitstream or by other means. Instead, the decoder identifies the object in at least two pictures either proceeding or succeeding the intermediate picture to be constructed, derives the intermediate object trajectory from these pictures, and uses this information to construct the intermediate picture(s).

The identification of the object could for instance be made by detecting motion vectors characteristic of such an object, e.g. a typical mouse pointer movement, or from prior knowledge of the mouse pointer shape and size.

The object trajectory may be derived from two or more pictures by fitting a curve through the known mouse pointer positions of these pictures. Possible curves include Bezier curves, B-spline curves and polynomials of degree D, where D is the number of pictures.

Change of Mouse Pointer Icon

A mouse pointer icon may change from time to time depending on where the mouse pointer is hovering and the action that is being performed. For instance, a mouse pointer arrow icon may change into a hand icon when moved on top of a link, or the mouse pointer icon may change into an hour glass when waiting for a process to complete.

In order to handle multiple mouse pointer icons when constructing intermediate pictures, more information could be obtained and used for constructing the intermediate pictures between two decoded pictures. In case of two different mouse pointer icons, the obtained information would need to comprise two separate sets of parameters such as mouse pointer reference, pixel mask, starting coordinates and size for the pixel mask. The two different sets could be received e.g. in a respective SEI message. The motion trajectory parameters may be shared between the parameter sets (different icons), but the starting and ending point for each icon should be specified separately, e.g. for each SEI message.

In addition to the first exemplifying SEI message provided above, an exemplifying SEI message handling multiple mouse pointer icons is illustrated below. Such an SEI message would also include a second sample_mask which would indicate the shape of the mouse pointer in the next coded picture. There would also be an indicator, such as an integer, included in the SEI message, that indicates from which intermediate position the new mouse pointer should be used. The example SEI message below comprises two 1 bit-per-pixel sample masks and equally spaced mouse pointer positions and an indication from where the second icon should be used.

| mouse_pointer_info( payloadSize ) { | Descriptor |
|---|---|
| start_coordinate_x | ue(v) |
| start_coordinate_y | ue(v) |
| size_x | ue(v) |
| size_y | ue(v) |
| for( i = 0; i <= size_x * size_y; i++ ) | |
|    sample_mask[ i ] | u(1) |
| number_of_positions | ue(v) |
| for( i = 0; i <= number_of_positions; i++ ) { | |
|    x_coord[ i ] | ue(v) |
|    y_coord[ i ] | ue(v) |
| } | |
| second_sample_mask_available | u(1) |
| if( second_sample_mask_available) { | |
|    second_size_x | ue(v) |
|    second_size_y | ue(v) |
|    for( i = 0; i <= second_size_x * second_size_y; i++ ) | |
|      second_sample_mask[ i ] | u(1) |
|    second_mask_start_position | ue(v) |
|    } | |
| } | |

Separate Picture Buffer for Object

In yet another embodiment the object is not included in the video that is input to the encoder, e.g. the screen dump has been made without including the object. In this embodiment it is probable that the object is a mouse pointer.

The mouse pointer icon and its motion trajectory must then be acquired by other means, for instance be derived through an API connected with the mouse pointer information. The mouse pointer may as in previous embodiments be signaled within the bitstream, but instead of signaling a reference picture and a pixel mask for the mouse pointer, the pixels for the mouse pointer itself are signaled, for instance using a separate RGB or RGBA picture buffer. The mouse pointer information could be signaled in an SEI message, in SPS/PPS or using auxiliary pictures.

Cost Vs Benefit

To get an understanding of the cost, in bits, of encoding a mouse pointer according to an embodiment of the herein suggested solution, a 35 pictures long static part of sc_map, a 1080p60 test sequence from the SCC standardization, was encoded at three different picture rates for comparison. The only movement in the static part is a mouse pointer doing a circular path. The static part was encoded at 60 fps, 30 fps and 5 fps using SCM-3.0 with the low delay main SCC configuration at fixed QP 32. For 30 fps and 5 fps intermediate input pictures were dropped before encoding. The result can be seen below in table 1. Note that an I-picture usually is sent very rarely in a screen sharing scenario, typically only as the first picture of the video.

TABLE 1

Comparison of coding the test sequence part at 60 pps, 30 pps and 5 pps (pps = pictures per second).

| Picture rate | Encoded I-pictures | Encoded B-pictures | Nbr bits I-pictures | Nbr bits B-pictures | Bitrate B-pictures (kbps) |
|---|---|---|---|---|---|
| 60 pps | 1 | 34 | 244512 | 10704 | 18.9 |
| 30 pps | 1 | 17 | 244512 | 8144 | 14.4 |
| 5 pps | 1 | 2 | 244512 | 1856 | 4.6 |

As shown in Table 1, the additional bitrate for B-pictures are 18.9 kbps for the 60 fps sequence. The cost of coding the full test sc_map sequence (600 pictures) with the same settings at QP 32 is 1029 kbps (910 kbps if you only count the 599 B-pictures). The minimum number of bits spent for a B-picture in the full sc_map sequence is 120 bits. For these pictures the picture did not change from the previous picture. From this we can estimate the high-level syntax signaling overhead is approximately 7.2 kbps (120 bits×60 pictures) for this sequence. The overhead of coding the mouse pointer could thus be estimated to be 18.9 kbps−7.2 kbps=11.7 kbps. In this perspective the cost of coding the mouse pointer becomes in the order of 11.7 kbps/910 kbps=1.3% of the total bitrate. This number may of course vary a lot depending on the spatial and temporal complexity of the screen sharing content, how much the mouse pointer is moved and at what quality the video is encoded.

Even though the coding of the mouse pointer adds some bits to the total bitrate, the extra bitrate is not a problem. The main problem is that while efficiently lowering the total bitrate of screen sharing video by lowering the picture rate, the mouse pointer gets a jerky motion and becomes difficult to control and follow.

Bezier Curves, B-Splines Etc.

Figure 6A:
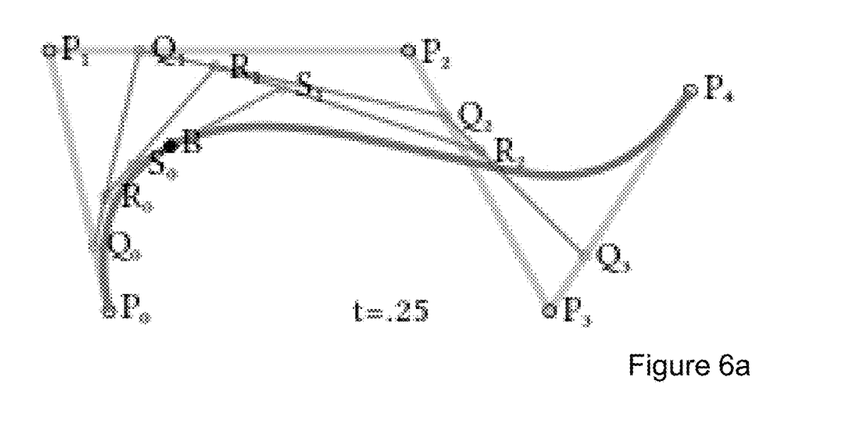
FIG. 6a shows an example of construction of a quartic (4-degree) Bezier curve.
Figure 6B:
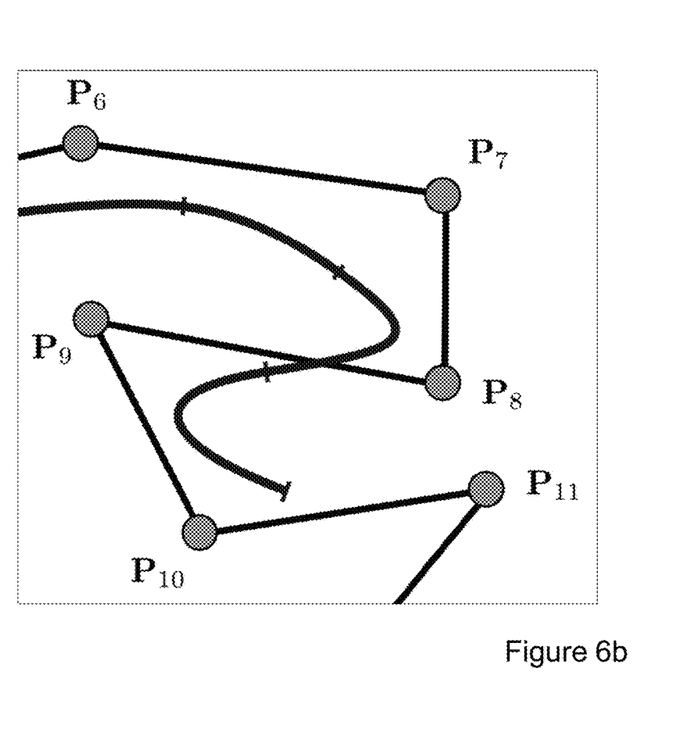
FIG. 6b shows an example of construction of a B-spline.

Below, some possible ways of representing the object movement will be described with reference to FIGS. 6a and 6b.

Bezier curves are parametric curves suitable for modeling smooth surfaces, which are often used in computer graphics and animations. Bezier curves, which can be scaled indefinitely, may be linked together to create smooth paths that are intuitive and easy to modify. One way to create Bezier curves is by use of the so-called Castlejau's algorithm. In its general form Bezier curves are expressed in terms of so-called Bernstein polynomials. An often more useful way is to express a Bezier curve as a polynomial of the form:

$$B(t) = \sum_{j=0}^{n} t^j C_j$$

where $$C_j = \frac{n!}{(n-j)!} \sum_{i=0}^{j} \frac{(-1)^{i+j} P_i}{i!(j-i)!} = \prod_{m=0}^{j-1}(n-m) \sum_{i=0}^{j} \frac{(-1)^{i+j} P_i}{i!(j-i)!}$$

and $P_i$ the start, end and control points of the Bezier curve. FIG. 6a shows an example of a quartic, i.e. 4-degree, Bezier curve using five points $P_j$. The points $Q_i$, $R_i$ and $S_i$ are intermediate calculated points which are used for constructing the curve. A Bezier curve has the following important properties:

The curve begins at point $P_0$ and ends a point $P_n$
The start (end) of the curve is tangent to the first (last) section of the Bezier polygon
A curve can be split at any point into two sub-curves
Every degree n curve is also a degree m curve for which m>n A B-spline function is a piecewise polynomial function of degree k in a variable x. The places where the pieces meet are known as knots. The number of knots must be equal to, or greater than k+1. FIG. 6b shows an example of a B-spline.

B-splines are considered as a generalization of Bezier curves with an important property that any spline function of degree k on a given set of knots can be expressed as a linear combination of B-splines:

$$S_{k,t}(x) = \sum_i \alpha_i B_{i,k}(x)$$

The polynomial pieces of a B-spline curve are expressed a follows:

$$B_{i,1}(x) := \begin{cases} 1 & \text{if } t_i \le x < t_{i+1} \\ 0 & \text{otherwise} \end{cases}$$

$$B_{i,k}(x) := \frac{x - t_i}{t_{i+k-1} - t_i} B_{i,k-1}(x) + \frac{t_{i+k} - x}{t_{i+k} - t_{i+1}} B_{i+1,k-1}(x)$$

Curve fitting can be made with B-splines using a least squared method with the following objective function:

$$U = \sum_{allz} \left\{ W(x) \left[ y(x) - \sum_i \alpha_i B_{i,k,t}(x) \right] \right\}^2$$

where W(x) is a weight and y(x) is the datum value at x. The coefficients $\alpha_i$ are the parameters to be determined.

For Bezier curves each intermediate point $P_i$ for each segment would need to be signaled and for B-spline curves the knots (break-points) should be signaled for each segment. The intermediate points $P_i$ and the knots could be signaled in a similar way as the coordinates in the version of the embodiment described above. The coefficients $\alpha_i$ and the degree k of B-spline function could be signaled or derived at the decoder side.

Implementations

The methods and techniques described above may be implemented in encoders and decoders, which may be part of communication devices which are configured for screen sharing. Screen sharing implies that pixels of a shared screen are encoded and provided, by an encoder, as encoded pictures, F, to a decoder. The pictures F are provided to the decoder with a picture rate R.

Figure 7A:
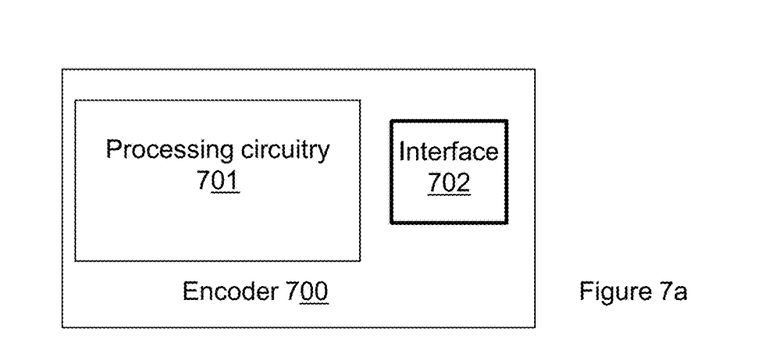
FIGS. 7a-7c illustrate different implementations of an encoder according to exemplifying embodiments.
Figure 7B:
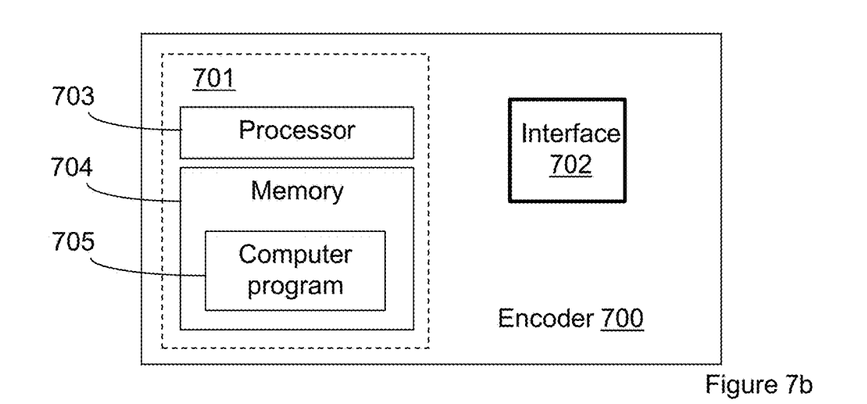
Figure 7C:
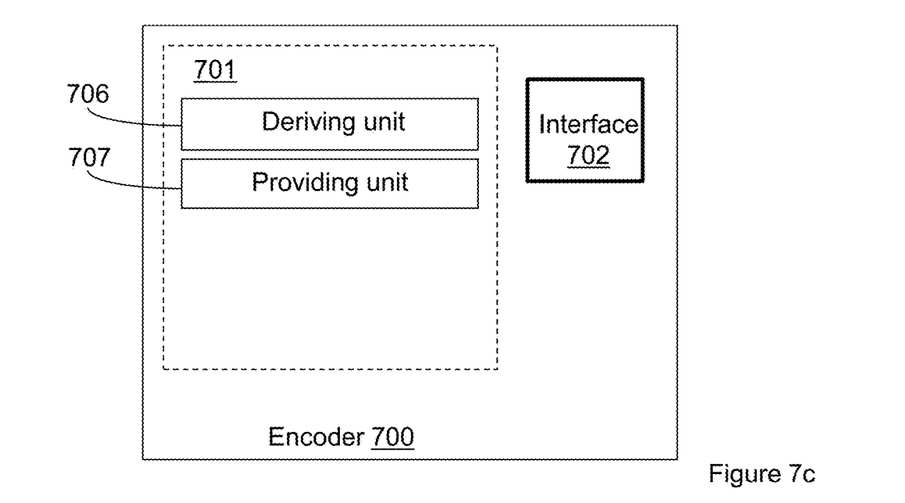

Encoder, FIGS. 7a-7c

An exemplifying embodiment of an encoder is illustrated in a general manner in FIG. 7a. By encoder is referred to an encoder for at least video signals. The encoder 700 is configured to perform at least one of the method embodiments described above e.g. with reference to FIG. 1. The encoder 700 is associated with the same technical features, objects and advantages as the previously described method embodiments. The encoder may be configured for being compliant with one or more standards for video coding/decoding, such as HEVC, and/or variants or extensions thereof. The encoder will be described in brief in order to avoid unnecessary repetition.

The encoder may be implemented and/or described as follows:

The encoder 700 is configured for supporting screen sharing. The encoder 700 comprises processing circuitry, or processing means 701 and a communication interface 702. The processing circuitry 701 is configured to cause the encoder 700 to derive information related to an object, such as a mouse pointer, a cursor or a window, which is moved on the shared screen between two pictures $F_n$ and $F_{n+1}$. At least part of the derived information is related to an intermediate position of the object, on the shared screen, between the two pictures $F_n$ and $F_{n+1}$. The processing circuitry 701 is further configured to cause the encoder to provide said information to the decoder. The communication interface 702, which may also be denoted e.g. Input/Output (I/O) interface, includes an interface for sending data to and receiving data from other entities or modules.

The processing circuitry 701 could, as illustrated in FIG. 7b, comprise processing means, such as a processor 703, e.g. a CPU, and a memory 704 for storing or holding instructions. The memory would then comprise instructions, e.g. in form of a computer program 705, which when executed by the processing means 703 causes the encoder 700 to perform the actions described above e.g. with reference to FIG. 1.

An alternative implementation of the processing circuitry 701 is shown in FIG. 7c. The processing circuitry here comprises a deriving unit 706, configured to cause the encoder 700 to derive information related to an object which is moved on the shared screen between two pictures $F_n$ and $F_{n+1}$. The processing circuitry further comprises a providing unit 707 configured to cause the encoder to provide said information to the decoder. The processing circuitry 701 could comprise more units, when required for performing embodiments of the herein suggested solution. Such tasks could alternatively be performed by one of the illustrated units.

The encoders described above could be configured for the different method embodiments described herein, related e.g. to the type of information to be derived, detection and representation of object and object movement, manner of providing information to a decoder, and estimation of disoccluded pixels.

The encoder 700 may be assumed to comprise further functionality, for carrying out regular encoder functions, e.g. associated with screen sharing.

Figure 8A:
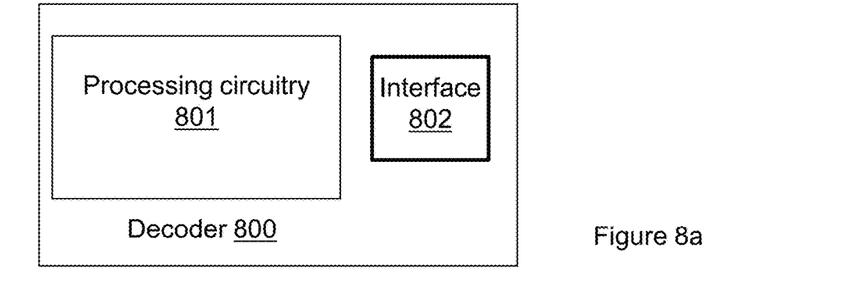
FIGS. 8a-8c illustrate different implementations of a decoder according to exemplifying embodiments.
Figure 8B:
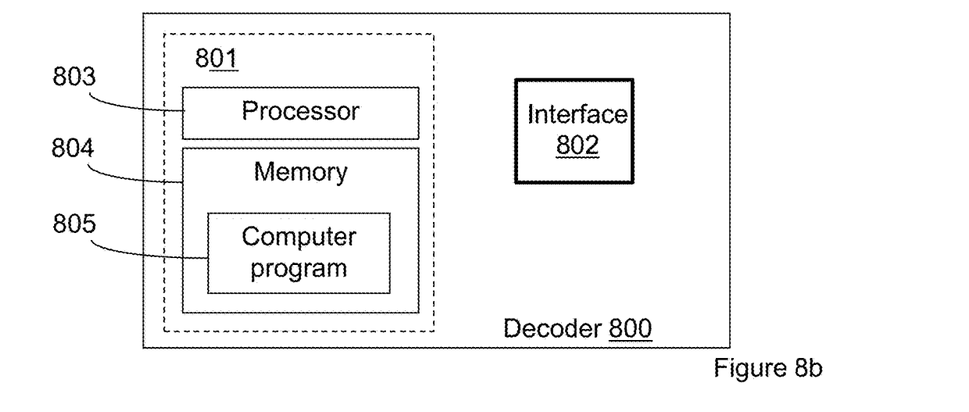
Figure 8C:
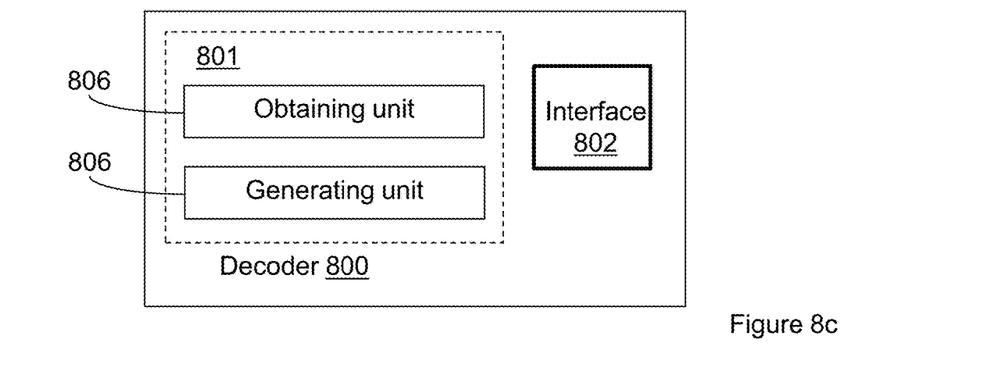

Decoder, FIGS. 8a-8c

Embodiments herein also relate to a decoder 800 configured for carrying out embodiments of the decoding method described above. That is, the method for supporting screen sharing, illustrated e.g. in FIG. 2. An exemplifying embodiment of a decoder 800 is illustrated in a general manner in FIG. 8a. The decoder 800 is configured to perform at least one of the method embodiments described above. The decoder 800 is associated with the same technical features, objects and advantages as the previously described method embodiments. The decoder may be configured for being compliant with one or more standards for video coding/decoding, such as HEVC, and/or variants or extensions thereof. The decoder will be described in brief in order to avoid unnecessary repetition.

The decoder 800 is configured for supporting screen sharing, and is operable to receive, with a picture rate R, from an encoder, encoded pictures F representing pixels of a shared screen, and decoding said received pictures. The decoder 800 comprises processing circuitry 801 and a communication interface 802. The processing circuitry 801 is configured to cause the decoder to obtain information related to an object which is moved on the shared screen between two received pictures $F_n$ and $F_{n+1}$, where at least part of the information is related to an intermediate position of the object between the two pictures $F_n$ and $F_{n+1}$. The processing circuitry 801 is further configured to cause the network node to generate intermediate pictures, $F_{IMD}$, in addition to the pictures, F, received with picture rate R, based on the obtained information. The communication interface 802, which may also be denoted e.g. Input/Output (I/O) interface, includes an interface for sending data to and receiving data from other entities or modules.

The processing circuitry 801 could, as illustrated in FIG. 8b, comprise processing means, such as a processor 803, and a memory 804 for storing or holding instructions. The memory would then comprise instructions, e.g. in form of computer program 805, which when executed by the processing means 803 causes the decoder 800 to perform the actions described above.

An alternative implementation of the processing circuitry 801 is shown in FIG. 8c. The processing circuitry here comprises a first obtaining unit 806, configured to cause the decoder to obtain information related to an object which is moved on the shared screen between two received pictures $F_n$ and $F_{n+1}$. The processing circuitry 801 further comprises a generating unit 807, configured to cause the decoder to generate intermediate pictures, $F_{IMD}$, in addition to the pictures, F, based on the obtained information.

The network node 800 may be assumed to comprise further functionality, for carrying out regular decoder functions.

The technology described above may be comprised e.g. in a communication device such as e.g. a user equipment, a tablet, an integrated or embedded wireless card, an externally plugged in wireless card, a dongle, etc., or in a stationary or semi stationary device, such as a personal computer, a video conference equipment or a smart TV.

Concluding Remarks

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In some instances herein, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

ABBREVIATIONS

AVC Advanced Video Coding
HEVC High Efficiency Video Coding
JCT-VC Joint Collaboration Team on Video Coding
PPS Picture Parameter Set
SCC Screen Content Coding
SEI Supplementary Enhancement Information
SPS Sequence Parameter Set
VPS Video Parameter Set

The invention claimed is:

1. A method for decoding a received bitstream comprising a plurality of pictures, encoded at a picture rate R, representing pixels of a shared screen, the method comprising:
receiving information describing an object appearing on the shared screen, the information including a representation of at least one position of the object on the screen in the duration between at least two consecutive ones of the plurality of pictures;
generating, based on the representation of the at least one position of the object, one or more representations of the object in the duration between the at least two consecutive ones of the plurality of pictures,
generating one or more pictures intermediate between the at least two consecutive ones of the plurality of pictures, the one or more intermediate pictures comprising the one or more representations of the object;
wherein the information describing the object is received in one or more messages distinct from the remainder of the bitstream.

2. The method of claim 1, wherein the representation of the at least one position of the object comprises at least one of:
parameters representing intermediate positions of the object between the at least two consecutive ones of the plurality of pictures;
coordinates representing positions of the object between the at least two consecutive ones of the plurality of pictures;
parameters representing a trajectory of the object between the at least two consecutive ones of the plurality of pictures; and
parameters representing a polynomial function describing a trajectory of the object between the at least two consecutive ones of the plurality of pictures.

3. The method of claim 1, wherein the information describing the object further comprises at least one of:
an indicator of the location of the object in a reference picture; and
an indicator of the outline of the object in a reference picture.

4. The method of claim 1, wherein the one or more messages are Supplementary Enhancement Information (SEI) messages.

5. The method of claim 1, wherein the information describing the object further comprises a descriptor of pixels in at least one of the plurality of pictures which are disoccluded by movement of the object.

6. The method of claim 1, further comprising
estimating the pixel values of pixels occluded by a position of the object in the first of the at least two consecutive ones of the plurality of pictures, and,
generating the one or more intermediate pictures by concealing the object at the position in the first of the at least two consecutive ones of the plurality of pictures, based on the estimated pixel values.

7. The method of claim 1, further comprising:
receiving an indicator that the one or more messages will be present in the bitstream.

8. The method of claim 1 where the object is one of: a mouse pointer, a cursor, an application window, 2D graphics, scrolling text, or an image.

9. A method-for transmitting an bitstream comprising a plurality of pictures, encoded at a picture rate R, representing pixels of a shared screen, the method comprising:
generating information describing an object appearing on the shared screen, the information including a representation of at least one position of the object on the screen in the duration between at least two consecutive ones of the plurality of pictures; and
transmitting the information to the decoder in one or more messages that are distinct from the remainder of the bitstream, thereby enabling the decoder to generate one or more pictures intermediate between the at least two consecutive ones of the plurality of pictures, the one or more intermediate pictures comprising one or more representations of the object derived from the representation of the least one position of the object.

10. The method of claim 9, wherein the representation of the at least one position of the object comprises at least one of:
parameters representing an intermediate position of the object between the at least two consecutive ones of the plurality of pictures;
coordinates representing a position of the object between the at least two consecutive ones of the plurality of pictures;
parameters representing a trajectory of the object between the at least two consecutive ones of the plurality of pictures;

parameters representing a polynomial function describing a trajectory of the object between the at least two consecutive ones of the plurality of pictures.

11. The method of claim 9, wherein the information describing the object further comprises at least one of:
an indicator of a location of the object in a reference picture;
an indicator of an outline of the object in a reference picture.

12. The method of claim 9, wherein the one or more messages are Supplementary Enhancement Information (SEI) messages.

13. The method of claim 9, wherein the information describing the object further comprises a descriptor of pixels in at least one of the plurality of pictures, which are disoccluded by movement of the object.

14. The method of claim 9, further comprising transmitting an indication that the one or more messages will be present in the bitstream.

15. The method of claim 9, where the object is one of: a mouse pointer, a cursor, an application window, 2D graphics, scrolling text or an image.

16. A decoder circuit configured to decode a received bitstream comprising a plurality of pictures, encoded at a picture rate R and representing pixels of a shared screen, the decoder circuit being further configured to:
receive information describing an object appearing on the shared screen, wherein:
the information includes a representation of at least one position of the object on the screen in the duration between at least two consecutive ones of the plurality of pictures; and
the information is received in one or more messages distinct from the remainder of the bitstream;
generate, based on the representation of the at least one position of the object, one or more representations of the object in the duration between the at least two consecutive ones of the plurality of pictures; and
generate one or more pictures intermediate between the at least two consecutive ones of the plurality of pictures, the one or more intermediate pictures comprising the one or more representations of the object.

17. The decoder circuit of claim 16, wherein the representation of the at least one position of the object comprises at least one of:
parameters representing an intermediate position of the object between the at least two consecutive ones of the plurality of pictures;
coordinates representing a position of the object between the at least two consecutive ones of the plurality of pictures;
parameters representing a trajectory of the object between the at least two consecutive ones of the plurality of pictures;
parameters representing a polynomial function describing a trajectory of the object between the at least two consecutive ones of the plurality of pictures.

18. The decoder circuit of claim 16, wherein the information describing the object comprises at least one of:
an indicator of the location of the object in a reference picture;
an indicator of the outline of the object in a reference picture.

19. The decoder circuit of claim 16, wherein the one or more messages are Supplementary Enhancement Information (SEI) messages.

20. The decoder circuit of claim 16, wherein the information describing the object further comprises a descriptor of pixels in at least one of the plurality of pictures, which are disoccluded by movement of the object.

21. The decoder circuit of claim 16, being further configured to
estimate the pixel values of pixels occluded by a position of the object in the first of the at least two consecutive ones of the plurality of pictures, and,
generate the one or more intermediate pictures by concealing the object at the position in the first of the at least two consecutive ones of the plurality of pictures, based on the estimated pixel values.

22. The decoder circuit of claim 16, being further configured to receive an indication that the one or more messages will be present in the bitstream.

23. A device comprising the decoder circuit of claim 16.

24. An encoder circuit configured to transmit a bitstream comprising a plurality of pictures, encoded at a picture rate R and representing pixels of a shared screen, the encoder circuit-being further configured to:
generate information describing an object appearing on the shared screen, the information including a representation of at least one position of the object on the screen in the duration between at least two consecutive ones of the plurality of pictures; and
transmit the information to the decoder in one or more messages that are distinct from the remainder of the bitstream, thereby enabling a decoder to generate one or more pictures intermediate between the at least two consecutive ones of the plurality of pictures, the one or more intermediate pictures comprising one or more representations of the object derived from the representation of the least one position of the object.

25. The encoder circuit of claim 24, wherein the representation of at least one position of the object comprises at least one of:
parameters representing an intermediate position of the object between the at least two consecutive ones of the plurality of pictures;
coordinates representing a position of the object between the at least two consecutive ones of the plurality of pictures;
parameters representing a trajectory of the object between the at least two consecutive ones of the plurality of pictures;
parameters representing a polynomial function describing a trajectory of the object between the at least two consecutive ones of the plurality of pictures.

26. The encoder circuit of claim 24, wherein the information describing an object comprises at least one of:
an indicator of a location of the object in a reference picture;
an indicator of an outline of the object in a reference picture.

27. The encoder circuit of claim 24, configured to transmit the information in a Supplementary Enhancement Information (SEI) message.

28. The encoder circuit of claim 24, wherein the information describing the object further comprises a descriptor of pixels in at least one of the plurality of pictures, which are disoccluded by movement of the object.

29. The encoder circuit of claim 24, further configured to transmit an indication that the one or more messages will be present in the bitstream.

30. A device comprising the encoder circuit of claim 24.

31. A non-transitory, computer-readable medium comprising computer-executable instructions that, when executed on at least one processor of a decoder circuit, cause the decoder circuit to:
  receive a bitstream comprising a plurality of pictures, encoded at a picture rate R and representing pixels of a shared screen, wherein:
    the bitstream further comprises information describing an object appearing on the shared screen;
    the information includes a representation of at least one position of the object on the screen in the duration between at least two consecutive ones of the plurality of pictures; and
    the information is received in one or more messages distinct from the remainder of the bitstream;
  generate, based on the representation of the at least one position of the object, one or more representations of the object in the duration between the at least two consecutive ones of the plurality of pictures; and
  generate one or more pictures intermediate between the at least two consecutive ones of the plurality of pictures, the one or more intermediate pictures comprising the one or more representations of the object.

32. A non-transitory, computer-readable medium comprising, computer-executable instructions that, when executed on at least one processor of an encoder circuit, cause the encoder circuit to:
  encode, at a picture rate R, a plurality of pictures representing pixels of a shared screen
  generate information describing an object appearing on the shared screen, the information including a representation of at least one position of the object on the screen in the duration between at least two consecutive ones of the plurality of pictures; and
  transmit a bitstream comprising the encoded plurality of pictures and one or more messages comprising the information describing the object, thereby enabling a decoder to generate one or more pictures intermediate between the at least two consecutive ones of the plurality of pictures, the one or more intermediate pictures comprising one or more representations of the object derived from the representation of the least one position of the object;
  wherein the one or more messages are distinct from the remainder of the bitstream.

* * * * *